US009390613B1

(12) United States Patent
Yu et al.

(10) Patent No.: US 9,390,613 B1
(45) Date of Patent: Jul. 12, 2016

(54) COMPUTER IMPLEMENTED SYSTEM FOR LOCATING USERS AND A METHOD THEREOF

(71) Applicant: REZOLT CORPORATION, SanJose, CA (US)

(72) Inventors: Yang Yu, SanJose, GA (US); Vijay Parmar, SanJose, CA (US)

(73) Assignee: Anaren, Inc., East Syracuse, NY (US)

( * ) Notice: Subject to any disclaimer, the term of this patent is extended or adjusted under 35 U.S.C. 154(b) by 0 days.

(21) Appl. No.: 14/520,291

(22) Filed: Oct. 21, 2014

(51) Int. Cl.
*G08B 25/01* (2006.01)
*H04N 21/2743* (2011.01)
*G06F 3/01* (2006.01)

(52) U.S. Cl.
CPC .............. *G08B 25/016* (2013.01); *G06F 3/017* (2013.01); *H04N 21/2743* (2013.01)

(58) Field of Classification Search
CPC ....... H04W 4/02; H04W 4/008; H04W 64/00; H04W 4/023; H04W 4/22; H04W 4/24; H04W 12/12
USPC ......................................................... 340/8.1
See application file for complete search history.

(56) References Cited

U.S. PATENT DOCUMENTS

| 7,406,507 | B2* | 7/2008 | Piccioni | G08B 25/08 340/6.1 |
| 7,589,628 | B1* | 9/2009 | Brady, Jr. | G01C 21/20 340/10.1 |
| 8,994,500 | B2* | 3/2015 | Ramaswamy | H04W 4/02 340/8.1 |

* cited by examiner

*Primary Examiner* — Mark Blouin
(74) *Attorney, Agent, or Firm* — Bond Schoeneck & King, PLLC

(57) ABSTRACT

A computer implemented system and method for locating a user have been envisaged. The system, in accordance with the embodiments herein includes a handheld device configured to identify the present location of the user, along with the audiovisual information corresponding to the identified location of the user. The handheld device transmits that location information and the audiovisual information to a centralized server, only in the event that the user performs a predetermined gesture. Subsequently, the centralized server processes the location information and the corresponding audiovisual information, and identifies at least one electronic communication device accessible to at least one of rescue personnel, and subsequently transmits the location information and the audiovisual information, to the identified electronic communication device, preferably along with an SOS message.

11 Claims, 3 Drawing Sheets

US 9,390,613 B1

COMPUTER IMPLEMENTED SYSTEM FOR LOCATING USERS AND A METHOD THEREOF

CROSS REFERENCE TO RELATED APPLICATIONS

The present patent application is related to and claims the benefit of priority from U.S. Provisional patent application Ser. No. 61/896,814, filed on Oct. 29, 2013, with the title "A NETWORK-ASSISTED SYSTEM AND METHOD FOR SEARCHING AND RESCUING LOST AND KIDNAPPED PERSONS", and the entire contents of which have been incorporated herein, by the way of reference.

BACKGROUND

1. Technical Field

The embodiments herein relates to systems and methods used for iterative tracking and rescuing of individuals. Particularly, the embodiments herein relates to computer implemented systems and methods utilized for tracking users and further utilized for sending distress signals on behalf of the user. More particularly, the embodiments herein relates to handheld devices used for tracking the location of the user, and for gathering information about the surroundings of a user, and for sending distress signals on behalf of the user.

2. Description of Related Art

In today's world people are bound to find themselves misplaced, lost given the fact that a person cannot be completely familiar with the city he lives in, or a place he visits. Further, there is also a probability that a person having a medical condition, for example, schizophrenia, Alzheimer's disease, can get lost, and finding lost individuals, amongst a plethora of people is a cumbersome task.

Typically, search and rescue operations rely upon visual cues during the initial phases of a search operation. However, in an unfriendly terrain, for example, a desert or a mountain range or a forest, it may not be possible for a group of rescuers to visually identify the location of a person in distress. Typically, beacons, flares are utilized to help the rescuers in visually identifying people in distress. Further, transmitters such as RFID tags also aid in identifying a person's location if the (lost) person is wearing the RFID tag.

While transmitters such as the RFID tags largely improve the efficiency of the rescue efforts, the transmitters are largely dependent on radio waves, and battery packs for being functional and effective. In the event that the battery of a transmitter is exhausted before the rescuers could identify the location of the person in distress, the rescuers would not be able to easily identify the person in distress.

Further, there is a possibility that the person in distress may have been separated from the transmitter, and in such a scenario, the transmitter would not transmit the actual location of the person in distress. Therefore, there was felt a need for a system that would obviate the disadvantages mentioned herein.

The above mentioned shortcomings, disadvantages and problems are addressed herein and which will be understood by reading and studying the following specification.

OBJECTIVES OF THE EMBODIMENTS

The primary object of the embodiments herein is to provide a computer implemented 'search and rescue network' (SRN).

Another object of the embodiments herein is to provide a handheld device that enables search, and rescue of individuals who have been kidnapped or have been lost in an unfamiliar terrain.

Yet another object of the embodiments herein, is to provide a search and rescue network that enables seamless communication between the rescue authorities, the government authorities, and a plurality of users.

Yet another object of the embodiments herein is to provide a handheld device that enables users thereof to generate and transmit distress signals, in case of an emergency.

Yet another object of the embodiments herein is to provide a handheld device capable of not only transmitting the location information corresponding to the user, but also the audiovisual information corresponding to the identified location of the user.

Yet another object of the embodiments herein is to provide a handheld device that is concealable from the public view.

Yet another object of the embodiments herein is to provide a computer-implemented search and rescue system that works on the phenomenon of crowd sourcing.

These and other objects and advantages of the embodiments herein will become readily apparent from the following detailed description taken in conjunction with the accompanying drawings.

SUMMARY

The embodiments herein envisage a computer implemented system for locating users. The system, in accordance with the embodiments herein comprises a repository configured to store at least the photographs, physical characteristics, address, medical history and contact information of a plurality of users.

According to one embodiment herein, the system further comprises a plurality of handheld devices respectively accessible to the plurality of users. Each of the handheld devices is configured to iteratively identify the location of the user having access to the respective handheld device. Further, the handheld device(s) are further configured to capture at least audiovisual information corresponding to the identified location of the user(s).

According, to one embodiment herein, the system further comprises a computer enabled communication network communicably coupled to the repository and each of the handheld devices. The communication network is configured to receive the information corresponding to the identified location of the user(s), and audiovisual information thereof.

According to one embodiment herein, the computer enabled communication network further comprises a centralized server, and a plurality of electronic communication devices communicably coupled to the centralized server via the communication network.

According to one embodiment herein, the centralized server is configured to process the location information corresponding to the user, and the audiovisual information thereof. The centralized server selectively identifies at least one electronic communication device proximate to the identified location of the user, and selectively communicates to the identified electronic communication device, the information corresponding to the location of the user, and the audiovisual information thereof. The centralized server selectively transmits the location information of the user, and the audiovisual information thereof, to people identified from the contact information of the user(s).

According to one embodiment herein, the handheld device(s) are configured to identify the location of the corresponding user(s), using a technology selected from the group consisting of Global Positioning System (GPS), and Mobile Phone Tower Triangulation.

According to one embodiment herein, the handheld device(s) comprise a plurality of input keys, and are configured to communicate the audiovisual information and information corresponding to the location of the respective user(s), based on a predetermined key press performed by the user.

According to one embodiment herein, the handheld device(s) are configured to be responsive to predetermined gestures performed by the respective user(s), and are configured to communicate the audiovisual information and information corresponding to the location of the respective user(s), based on the predetermined gestures performed by the respective user(s).

According to one embodiment herein, the handheld device(s) further comprise a multi-axis accelerometer configured to detect and quantify the movements of the user(s). The handheld device(s) is/are further configured to selectively transmit the information corresponding to the movements of the user(s) via the communication network to the centralized server.

The embodiments herein envisage a computer implemented method for locating users. The method, in accordance with the embodiments herein comprises the following steps:

storing at least the photographs, physical characteristics, address, medical history and contact information of a plurality of users, in a repository;

iteratively identifying the location of the user(s) using the handheld device(s);

capturing at least audiovisual information corresponding to the identified location of the user(s), using the handheld device(s);

selectively transmitting the information corresponding to the identified location of the user(s), and audiovisual information thereof, from the handheld device(s) to a centralized server via a computer enabled communication network;

processing the location information corresponding to the user, and the audiovisual information thereof, at the centralized server;

identifying at least one electronic communication device proximate to the identified location of the user;

communicating to the identified electronic communication device, the information corresponding to the location of the user, and the audiovisual information thereof; and selectively transmitting the location information of the user, and the audiovisual information thereof, to people identified from the contact of the user(s).

According to one embodiment herein, the step of selectively transmitting the information corresponding to the identified location of the user(s) and audiovisual information thereof further includes the step of communicating the audiovisual information and information corresponding to the location of the respective user(s), from the handheld device(s) based on a predetermined key press performed by the user.

According to one embodiment herein, the step of selectively transmitting the information corresponding to the identified location of the user(s) and audiovisual information thereof, further includes the step of communicating the audiovisual information and information corresponding to the location of the respective user(s), from the handheld device(s) based on predetermined gestures performed by the user(s) on the respective handheld device(s).

According to one embodiment herein, the step of iteratively identifying the location of the user(s) using the handheld device(s), further includes the steps of detecting and quantifying the movements of the user(s), and selectively transmitting the information corresponding to the movements of the user(s) via the communication network to the centralized server.

The embodiments herein envisage a computer program product having computer readable instructions stored upon a non-transitory computer readable medium, the computer readable instructions, when executed by a processor, cause the processor to:

store at least the photographs, physical characteristics, address, medical history and contact information of a plurality of users, in a repository;

iteratively identify the location of the user(s) using handheld device(s) accessible to respective user(s);

capture at least audiovisual information corresponding to the identified location of the user(s), using the handheld device(s);

selectively transmit the information corresponding to the identified location of the user and audiovisual information thereof, from the handheld device(s) to a centralized server via a computer enabled communication network;

process the location information corresponding to the user(s), and the audiovisual information thereof;

identify at least one electronic communication device proximate to the identified location of the user;

communicate to the identified electronic communication device, the information corresponding to the location of the user, and the audiovisual information thereof; and selectively transmit the location information of the user, and the audiovisual information thereof, to people identified from the contact information of the user(s).

According to one embodiment herein, the computer readable instructions further cause the processor to:

communicate the audiovisual information and information corresponding to the location of the respective user(s), from the handheld device(s) based on a predetermined key press performed by the user;

communicate the audiovisual information and information corresponding to the location of the respective user(s), from the handheld device(s), based on predetermined gestures performed by the user(s) on the respective handheld device(s); and detect and quantify the movements of the user(s), and selectively transmit the information corresponding to the movements of the user(s) via the communication network to the centralized server.

These and other aspects of the embodiments herein will be better appreciated and understood when considered in conjunction with the following description and the accompanying drawings. It should be understood, however, that the following descriptions, while indicating the preferred embodiments and numerous specific details thereof are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings, in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The prior art devices used for locating people communicate via radio signals, and are only capable of providing information about only the geographical location (latitude/longitude) of the person in distress. The prior art devices lack the capability of providing visual and audiovisual indications about the location of the person in distress.

Therefore, there is a need for a system which could work with the existing telecommunication architecture and location mapping systems, for example, GPRS and GPS respectively and yet provide for audiovisual information corresponding, to they location of the user(s). There was also felt a need for a handheld device that can be used by the user(s) to seamlessly transmit a distress signal, in case of an emergency situation. Further, there was also felt a need for a system that would enable the formation of an ad-hoc 'search and rescue' network, by interconnecting a centralized server, a plurality of handheld devices accessible to the users, and a plurality of electronic communication devices via a computer enabled communication network.

Figure 1:
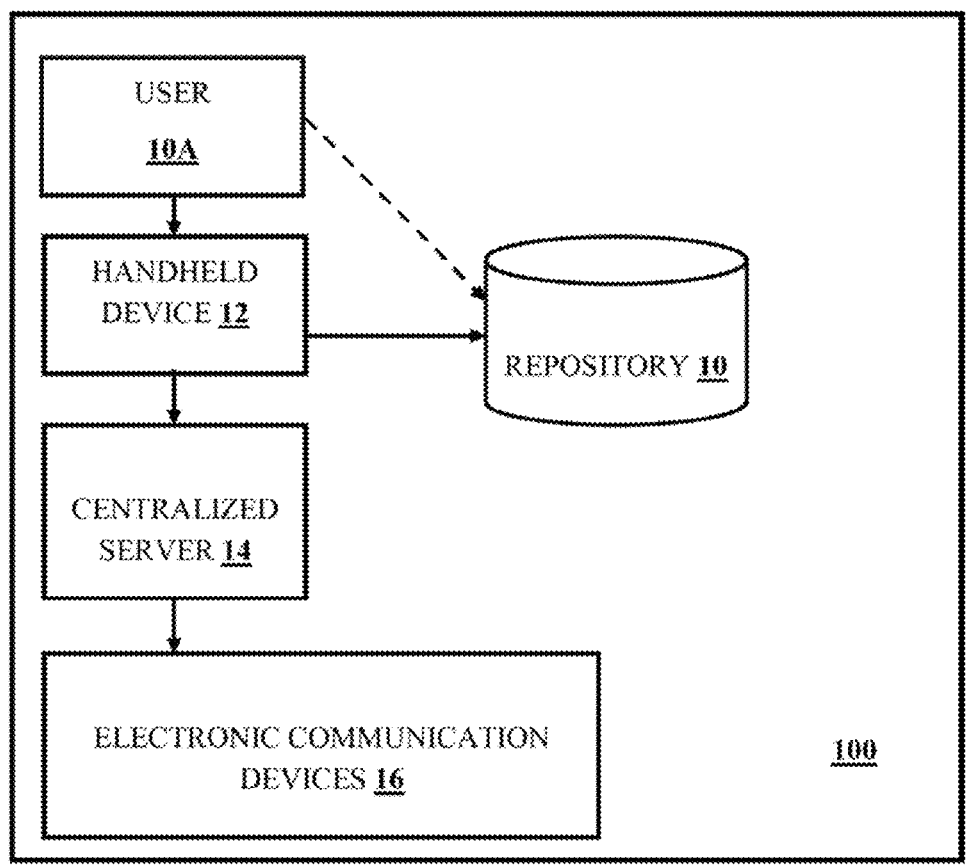
FIG. 1 illustrates a block diagram corresponding to the computer implemented system for locating users.

In order to obviate the disadvantages of the prior art system, the various embodiments herein envisages a computer implemented system for locating users. Referring to FIG. 1, there shown a computer implemented system. 100 for locating users. The system 100, in accordance with the embodiments herein comprises a repository 10 configured to store information about each of the users of the system 100. The information stored in the repository includes, but is not restricted to photographs (for identifying each of the users), physical characteristics (including but not restricted to age, height) body weight, body type, and information about any physical disabilities), address, medical history (including the history of diseases and the corresponding, medication), and contact information (including users' contact details, and contact details of friends and relatives of respective users).

According to one embodiment herein, the system 100 further includes a plurality of handheld devices collectively represented by the reference numeral 12 for the ease of explanation. The handheld devices 12, in accordance with one embodiment of the embodiments herein can be worn in such a way that they are concealed from public view, for example, the handheld devices 12 can be worn on the upper arm, thereby concealing, it from public view. Further, the handheld devices 12 comprise a plurality of input keys. The handheld devices 12 are configured to iteratively identify the current geographic location of the corresponding users, using a technology selected form the group consisting of GPS and mobile phone tower triangulation.

According to one embodiment herein, the handheld devices 12 are configured to communicate with a centralized server 14. In accordance with the embodiments herein, the repository 10 is communicably coupled to the centralized server 14. The handheld devices 12 cooperate with the centralized server 14 (referred to as 'server' hereafter), and transmit the location information, that is at least the latitude and longitude corresponding to the location of a user, to the server 14. In accordance with the embodiments herein, the handheld devices 12 which are equipped with GPS receivers (not shown in figures) are configured to track both the real-time and historical locations of the respective users, and transmit the location information to the server 14.

According to one embodiment it herein, the handheld devices 12 are further configured to elicit the audiovisual information corresponding to the (real-time) location of the respective users. The handheld devices 12 in accordance with the embodiments herein comprise audio recorders and cameras configured to capture the audiovisual information (including a video of the surrounding ding of the identified location of a user, and an optional audio clip, and a combination thereof). The handheld devices 12, in accordance with one embodiment of the embodiments herein are configured to capture and transmit the audiovisual information, subsequent to an input key (for example, an input key being designated as a 'panic button') being pressed by the user. Further, in accordance with another embodiment herein, the handheld devices 12 are configured to capture and transmit the audiovisual information, subsequent to a predefined pattern (for example an 'x' pattern, a 'z' pattern) being drawn by a user on the user-interface of a handheld device 12. Further, in accordance with another embodiment of the present disclosure, the handheld devices 12 are configured to capture and transmit the audiovisual information, subsequent to a predefined sequence of input keys being pressed by a user.

Further, the repository 10 is further configured to stores unique identifiers that uniquely identify each of the handheld devices 12. Preferably, the unique identifiers are hard coded on to each of the handheld devices 12, and the handheld devices 12 are adapted to transmit the unique identification code to the server 14 along with the location information and the audiovisual information. The unique identifier also maps a particular handheld device 12 to a particular user, such that by way of the identifier, the handheld device 12 and the user using, the said handheld device could be identified.

According, to one embodiment herein, the location information and the audiovisual information transmitted by each of the handheld devices 12 are received by the (centralized) server 14 via a computer enabled communication network (not shown in figures). The server 14, in accordance with the embodiments herein, is configured to process the audiovisual information and the location information corresponding to the users, and identify the current location of the corresponding user.

According to one embodiment herein, a plurality of electronic communication devices 16 are communicably coupled to the server 14 via the computer enabled communication network. The server 14, depending upon the identified location of the user, identifies at least one electronic communication device 16 proximate to the location of the user. In accordance with the embodiments herein, the electronic communication devices 16 are accessible to rescue personnel, government employees including firefighting personnel, police officers and the like. In accordance with the embodiments herein, the electronic communication devices 16 could also include electronic communication devices accessible to other users of the system 100. In accordance with the embodiments herein, the server 14 transmits to the identified electronic communication device 16, the location of the user, along with the corresponding audiovisual information, in order to assist in locating the user. Further, the server 14 is configured to transmit the location information corresponding to the user, and the audiovisual information thereof, to at least the people who are identified as a user's friends/relatives, from the contact details of the user stored in the repository 10.

According to one embodiment herein, the system 100 can be used as a 'search and rescue' network that could assist in rescuing people who have been kidnapped or lost in an unfamiliar terrain. In accordance with the embodiments herein, the details corresponding to a user 10A, i.e., photographs, physical characteristics (age, height, body weight, body type, and information about any physical disabilities), address, medical history, and contact information (including user 10A contact details, and contact details of friends and relatives of user 10A), are stored in the repository 10. Further, the repository 10 also stores a unique identifier that uniquely identifies the handheld device 12 accessible to the user 10A.

According to one embodiment herein, the handheld device 12 of user 10A is communicably coupled to the server 14 to which the handheld device 12 transmits, the location of the user 10A and the audiovisual information captured from the location of the user 10A, only in the event that the user 10A performs a predefined input key press (i.e., pressing a button designated as panic button), or performs a series of key press (i.e., pressing a plurality of input keys so as to form a predefined pattern), or draws a predefined pattern on the user interface (not shown) of the handheld device 12. Therefore, in the event that the user 10A realizes that he has been kidnapped/about to be kidnapped, or lost in an unfamiliar terrain, he can perform either of the aforementioned gestures on the handheld device 12, in order to ensure that the corresponding location information and audiovisual information is elicited by the handheld device 12 and transmitted to the server 14.

The server 14, according to one embodiment herein is communicably coupled to a plurality of electronic communication devices 16 via the computer implemented communication network (not shown in figures). The electronic communication devices 16 include but are not restricted to mobile phones, smart phones, tablets, desktop computers and laptop computers. In accordance with the embodiments herein, the electronic communication devices 16 are typically accessible to rescue personnel, firefighting personnel, police offices, medical and paramedical staff, and the like, who could assist in rescuing the user 10A. The server 14 on receiving the location information and audiovisual information corresponding to the user 10A, identifies an electronic communication device 16 that is located at a relatively close proximity (in comparison to other electronic communication devices) to the identified location of the user. Further, the server 14 transmits to the identified electronic communication device 16, the (identified) location of the user 10A and the audiovisual information thereof, preferably along with an SOS message informing the user (a police officer or medical/paramedical personnel or rescue personnel) of the electronic communication device 16 that the user 10A has been in a distress and that he (user 10A) needs assistance.

According to one embodiment herein, the handheld devices 12, the centralized server 14, the electronic communication devices 16 when communicably coupled over the computer implemented communication network, form the search and rescue network, which could be used to seamlessly locate the user 10A, and if there is a necessity, rescue the user 10A. In accordance with one embodiment of the present disclosure, the centralized server 14 is a cloud-based server.

According to one embodiment herein, the centralized server 14, upon receiving the location information and the audiovisual information corresponding to the user 10A, can send the received information (location and audiovisual information), to other users of the system 100 who are identified to be at proximity (based on their respective locations) to the location of the user 10A, preferably with an SOS message informing the users of the system 100 that the user 10A has been in a distress and that he (user 10A) needs assistance.

According to one embodiment herein, the handheld devices 12 are selected from the group consisting of mobile phone, smart phone, electronic wrist band, tablet PC and laptop computer. Further, the handheld devices 12 include a plurality of sensors including but not restricted to a 3-axis accelerometer that collect information regarding the movements of the user 10A on the three possible axes (i.e., x-axis, y-axis and z-axis), and also determines the speed at which the user is travelling, along with determining the direction of motion of the user 10A. Further, the information elicited from the three-axis accelerometer is also transmitted to the server 14, and subsequently stored in the repository 12.

Figure 2A:
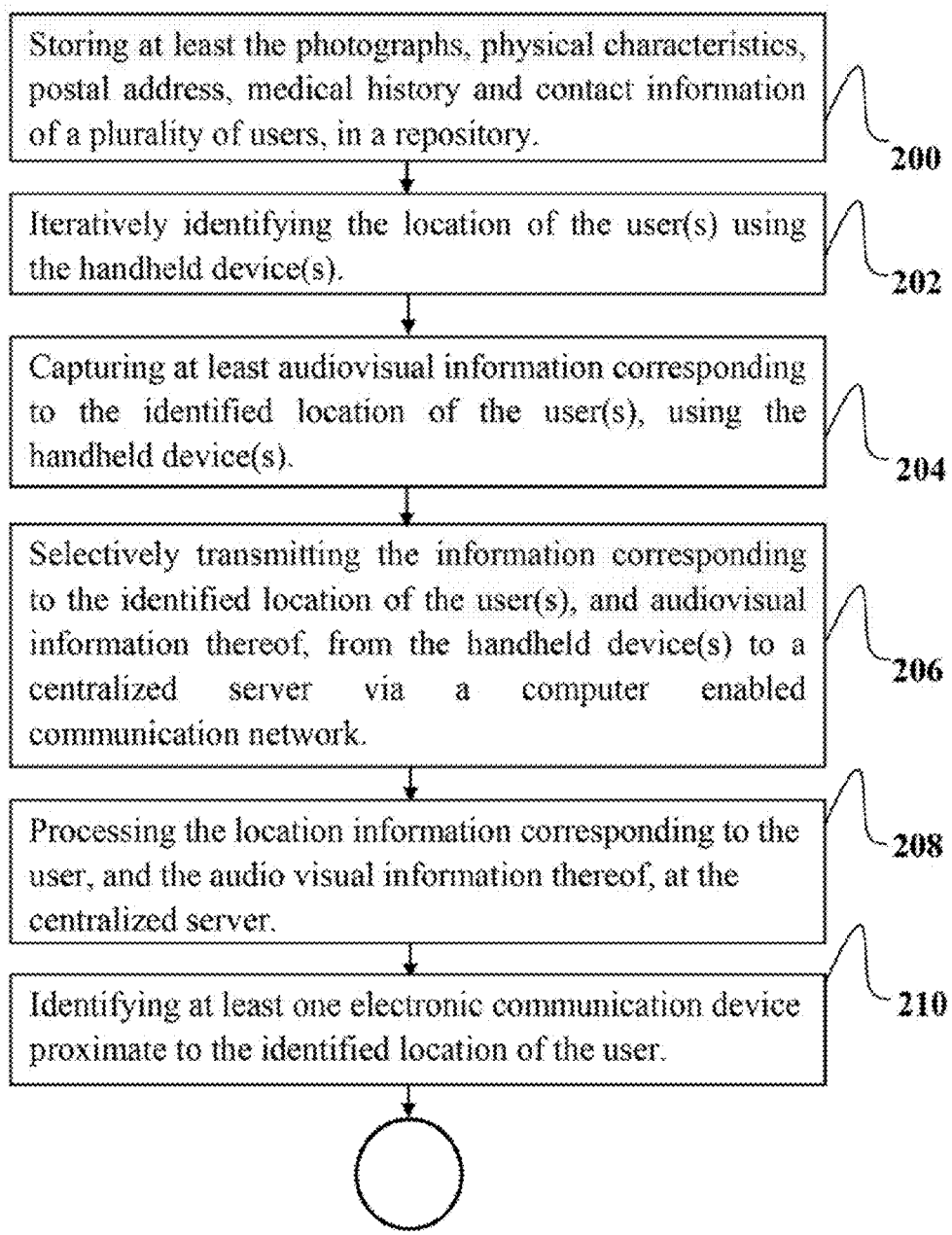
FIGS. 2A and 2B in combination represent a flow chart illustrating the steps involved in the computer-implemented method for locating users.
Figure 2B:
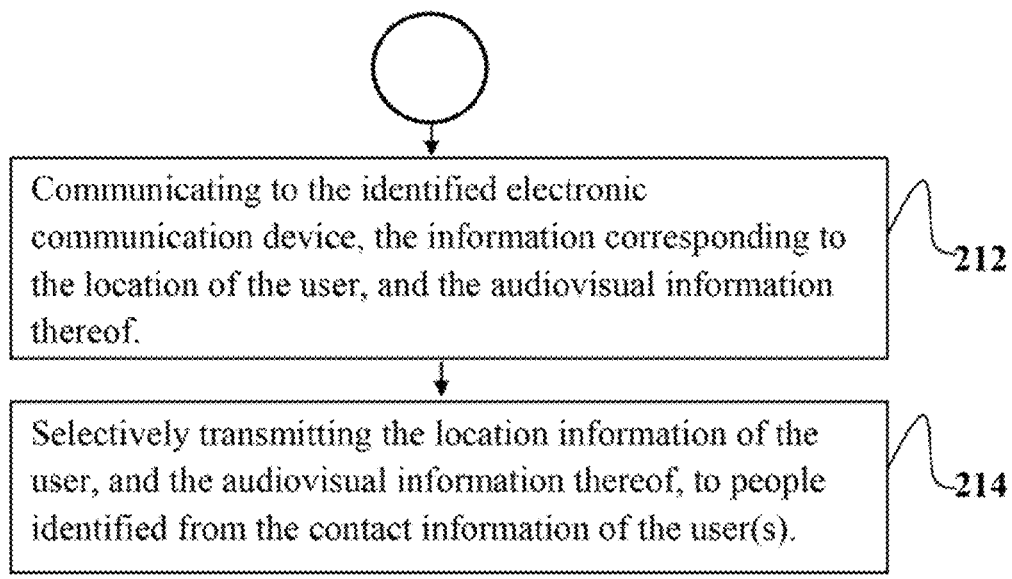

Referring to FIGS. 2A and 2B, there is shown a flowchart illustrating the steps involved in the computer-implemented method for locating users. The method, according to one embodiment herein, and as shown in FIG. 2 comprises the following steps:

storing at least the photographs, physical characteristics, address, medical history and contact information of a plurality of users, in a repository (200);

iteratively identifying the location of the user(s) using the handheld device(s) (202);

capturing at least audiovisual information corresponding to the identified location of the user(s), using the handheld device(s) (204);

selectively transmitting the information corresponding to the identified location of the user(s), and audiovisual information thereof, from the handheld device(s) to a centralized server via a computer enabled communication network (206);

processing the location information corresponding to the use and the audiovisual information thereof, at the centralized server (208);

identifying at least one electronic communication device proximate to the identified location of the user (210);

communicating to the identified electronic communication device, the information corresponding to the location of the user, and the audiovisual information thereof (212); and selectively transmitting the location information of the user, and the audiovisual information thereof, to people identified from the contact information of the user(s) (214).

According to one embodiment herein, the step of selectively transmitting the information corresponding to the identified location of the user(s) and audiovisual information thereof further includes the step of communicating the audiovisual information and information corresponding to the location of the respective, user(s), from the handheld device(s) based on a predetermined key press performed by the user.

According to one embodiment herein, the step of selectively transmitting the information corresponding to the identified location of the user(s) and audiovisual information thereof further includes the step of communicating the audiovisual information and information corresponding to the location of the respective user(s), from the handheld device(s) based on predetermined gestures performed by the user(s) on the respective handheld device(s).

According to one embodiment herein, the step of iteratively identifying the location of the user(s) using the handheld device(s), further includes the steps of detecting and quantifying the movements of the user(s), and selectively transmitting the information corresponding to the movements of the user(s) via the communication network to the centralized server.

According to one embodiment herein, a computer program product having computer readable instructions stored upon a non-transitory computer readable medium has been disclosed. The computer readable instructions, when executed by a processor, cause the processor to:

store at least the photographs, physical characteristics, address, medical history and contact information of a plurality of users, in a repository;

iteratively identify the location of the user using handheld device(s) accessible to respective user(s);

capture at least audiovisual information corresponding to the identified location of the user(s), using the handheld device(s);

selectively transmit the information corresponding to the identified location of the user(s), and audiovisual information thereof, from the handheld device(s) to a centralized server via a computer enabled communication network;

process the location information corresponding to the user(s), and the audiovisual information thereof;

identify at least one electronic communication device proximate to the identified location of the user;

communicate to the identified electronic communication device, the information corresponding to the location of the user, and the audiovisual information thereof; and selectively transmit the location information of the user, and the audiovisual information thereof, to people identified from the contact information of the user(s).

According to one embodiment herein, the computer readable instructions further cause the processor to:

communicate the audiovisual information and information corresponding to the location of the respective user(s), form the handheld device(s) based on a predetermined key press performed by the user;

communicate the audiovisual information and information corresponding to the location of the respective user(s), from the handheld device(s), based on predetermined gestures performed by the user on the respective handheld device(s); and detect and quantify the movements of the user(s), and selectively transmit the information corresponding to the movements of the user(s) via the communication network to the centralized server.

The technical advantages of the embodiments herein include the realization of a computer implemented search and rescue network (SRN), that enables a plurality of users to communicate seamlessly with rescue personnel, medial & paramedical staff, law enforcement personnel, in case of an emergency. Further, the embodiments herein envisage a handheld device capable of not only identifying the location of the user thereof but also captures the audiovisual information corresponding to the identified location of the user. Further, another technical advantage offered by the embodiments herein is that the handheld device (envisaged by the embodiments herein) enables users seamlessly generate and transmit distress signals to government authorities, rescue personnel, medial & paramedical staff, and other users, in case of an emergency.

The foregoing description of the specific embodiments will so fully reveal the general nature of the embodiments herein that others can, by applying current knowledge, readily modify and/or adapt for various applications such specific embodiments without departing from the generic concept, and therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications.

Although the embodiments herein are described with various specific embodiments, it will be obvious for a person skilled in the art to practice the embodiments herein with modifications.

It is also to be understood that the following claims are intended to cover all of the generic and specific features of the embodiments described herein and all the statements of the scope of the embodiments which as a matter of language might be said to fall there between.

What is claimed is:

1. A computer implemented system for locating users, said system comprising:

a repository configured to store at least the photographs, physical characteristics, address, medical history and contact information of a plurality of users;

a plurality of handheld devices respectively accessible to the plurality of users, each of said handheld devices configured to iteratively identify the location of the user having access to the respective handheld device, said handheld device(s) further configured to capture at least audiovisual information corresponding to the identified location of the user(s);

a computer enabled communication network communicably coupled to said repository and each of said handheld devices, said communication network configured to receive the information corresponding to the identified location of the user(s), and audiovisual information thereof, said communication network further comprising:

a centralized server, and a plurality of electronic communication devices communicably coupled to said centralized server via said communication network, wherein said centralazed server is configured to process the location information corresponding to the user and the audiovisual information thereof, said server still further configured to selectively identify at least one electronic communication device proximate to the identified location of the user, said server still further configured to selectively communicate to identified electronic communication device, the information corresponding to the location of the user and the audiovisual information thereof, said centralized server still further configured to selectively transmit the location information of the user and the audiovisual information thereof, to people identified from the contact information of the user(s).

2. The system as claimed in claim 1, wherein said handheld device(s) are configured to identify the location of the corresponding user(s), using a technology selected from the group consisting of Global Positioning System (GPS), and Mobile Phone Tower Triangulation.

3. The system as claimed in claim 1, wherein said handheld device(s) comprise a plurality of input keys, said handheld device(s) configured to communicate said audiovisual information and information corresponding to the location of the respective user(s), based on a predetermined key press performed by the user.

4. The system as claimed in claim 1, wherein said handheld device(s) are configured to be responsive to predetermined gestures performed by the respective user(s), said handheld device(s) further configured to communicate said audiovisual information and information corresponding to the location of the respective user(s), based on said predetermined gestures performed by the respective user(s).

5. The system as claimed in claim 1, wherein said handheld device(s) further comprises a multi-axis accelerometer configured to detect and quantify the movements of the user(s), said handheld device(s) further configured to selectively transmit the information corresponding to the movements of the user(s) via said communication network to said centralized server.

6. A computer implemented method for locating users, said method comprising the following computer implemented steps:

storing at least the photographs, physical characteristics, address, medical history and contact information of a plurality of users, in a repository;

iteratively identifying the location of the user(s) using said handheld device(s);

capturing at least audiovisual information corresponding to the identified location of the user(s), using said handheld device(s);

selectively transmitting the information corresponding to the identified location of the user(s), and audiovisual information thereof, from said handheld device(s) to a centralized server via a computer enabled communication network;

processing the location information corresponding to the user, and the audiovisual information thereof, at said centralized server;

identifying at least one electronic communication device proximate to the identified location of the user;

communicating to the identified electronic communication device, the information corresponding to the location of the user, and the audiovisual information thereof; and selectively transmitting the location information of the user, and the audiovisual information thereof, to people identified from the contact information of the user(s).

7. The method as claimed in claim 6, wherein the step of selectively transmitting the information corresponding to the identified location of the user(s) and audiovisual information thereof, further includes the step of communicating said audiovisual information and information corresponding to the location of the respective user(s), from the handheld device(s) based on a predetermined key press performed by the user.

8. The method as claimed in claim 6, wherein the step of selectively transmitting the information corresponding to the identified location of the user(s) and audiovisual information thereof, further includes the step of communicating said audiovisual information and information corresponding to the location of the respective user(s), from the handheld device(s) based on predetermined gestures performed by the user(s) on the respective handheld device(s).

9. The method as claimed in claim 6, wherein the step of iteratively identifying the location of the user(s) using said handheld device(s), further includes the steps of detecting and quantifying the movements of the user(s), and selectively transmitting the information corresponding to the movements of the user(s) via said communication network to said centralized server.

10. A computer program product having computer readable instructions stored upon a non-transitory computer readable medium, said computer readable instructions, when executed by a processor, cause the processor to:

store at least the photographs, physical characteristics, address, medical history and contact information of a plurality of users, in a repository;

iteratively identify the location of the user(s) using handheld device(s) accessible to respective user(s);

capture at least audiovisual information corresponding to the identified location of the user(s), using said handheld device(s);

selectively transmit the information corresponding to the identified location of the user(s), and audiovisual information thereof, from said handheld device(s) to a centralized server via a computer enabled communication network;

process the location information corresponding to the user(s), and the audiovisual information thereof;

identify at least one electronic communication device proximate to the identified location of the user;

communicate to the identified electronic communication device, the information corresponding to the location of the user, and the audiovisual information thereof; and selectively transmit the location information of the user, and the audiovisual information thereof, to people identified from the contact information of the user(s).

11. The computer readable instructions as claimed in claim 10, wherein said computer readable instructions further cause the processor to:

communicate said audiovisual information and information corresponding to the location of the respective user(s), from the handheld device(s) based on a predetermined key press performed by the user;

communicate said audiovisual information and information corresponding to the location of the respective user(s), from the handheld device(s), based on predetermined gestures performed by the user(s) on the respective handheld device(s); and detect and quantify the movements of the user(s), and selectively transmit the information corresponding to the movements of the user(s) via said communication network to said centralized server.

\* \* \* \* \*